US010007632B2

(12) United States Patent
Bailey et al.

(10) Patent No.: US 10,007,632 B2
(45) Date of Patent: Jun. 26, 2018

(54) COMPUTING DEVICE INTERFACE CONNECTORS FOR PERIPHERAL COMPONENT INTERCONNECT COMPLIANT DEVICES AND OTHER DEVICES

(71) Applicant: Lenovo Enterprise Solutions (Singapore) PTE. LTD., Singapore (SG)

(72) Inventors: Warren D. Bailey, Pittsboro, NC (US); Gregory D. Sellman, Morrisville, NC (US); Galan J. Willig, Durham, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 321 days.

(21) Appl. No.: 14/160,616

(22) Filed: Jan. 22, 2014

(65) Prior Publication Data
US 2015/0205745 A1 Jul. 23, 2015

(51) Int. Cl.
*G06F 13/40* (2006.01)
*G06F 13/38* (2006.01)

(52) U.S. Cl.
CPC ........ *G06F 13/4027* (2013.01); *G06F 13/385* (2013.01)

(58) Field of Classification Search
CPC .......................... G06F 13/385; G06F 13/4027
USPC ....... 710/300, 301, 105, 305, 313, 314, 315; 713/300, 340
See application file for complete search history.

(56) References Cited

U.S. PATENT DOCUMENTS

| | | | |
|---|---|---|---|
| 5,644,734 A | | 7/1997 | Hong |
| 6,438,429 B1* | | 8/2002 | Ho et al. .......................... 700/22 |
| 6,735,660 B1 | | 5/2004 | Osten et al. |
| 8,069,293 B1* | | 11/2011 | Rogan et al. ................. 710/301 |
| 8,150,953 B2* | | 4/2012 | Mittapalli et al. ............. 709/223 |
| 8,671,236 B2* | | 3/2014 | Goldenberg et al. ......... 710/305 |
| 2003/0188054 A1* | | 10/2003 | Yosimoto et al. .............. 710/22 |
| 2004/0167994 A1* | | 8/2004 | Hisano ................ G06F 13/4269 710/3 |
| 2007/0121492 A1* | | 5/2007 | Johns ..................... G01K 3/005 370/223 |
| 2007/0153780 A1* | | 7/2007 | Stanley ................ G01R 31/007 370/360 |
| 2009/0030644 A1* | | 1/2009 | Johns ..................... G01K 3/005 702/130 |

(Continued)

OTHER PUBLICATIONS

"Conventional PCI", <https://en.wikipedia.org/wiki/Conventional_PCI>, accessed on Jan. 14, 2016.*

(Continued)

*Primary Examiner* — Nimesh G Patel
(74) *Attorney, Agent, or Firm* — Olive Law Group, PLLC

(57) ABSTRACT

Computing device interface connectors for PCI compliant devices and other devices are disclosed. According to an aspect, an apparatus includes a PCI compliant device residing on a computing device. Further, the apparatus includes another device such as a network controller sideband interface (NCSI) compliant device residing on the computing device. The apparatus also includes an interface connector being communicatively connected to the PCI compliant device and the NCSI compliant device.

18 Claims, 12 Drawing Sheets

(56) References Cited

U.S. PATENT DOCUMENTS

| | | | | |
|---|---|---|---|---|
| 2009/0164690 A1* | 6/2009 | Slaight | | 710/306 |
| 2009/0222623 A1* | 9/2009 | Nakamura | | G06F 3/0617 |
| | | | | 711/114 |
| 2011/0138095 A1* | 6/2011 | Campbell | | G06F 13/409 |
| | | | | 710/301 |
| 2011/0292807 A1* | 12/2011 | Shah et al. | | 370/237 |
| 2012/0311220 A1* | 12/2012 | Goldenberg | | G06F 13/387 |
| | | | | 710/313 |
| 2013/0326039 A1* | 12/2013 | Shah | | 709/223 |
| 2015/0205746 A1* | 7/2015 | Bailey et al. | | 710/303 |

OTHER PUBLICATIONS

"Ethernet", <https://en.wikipedia.org/wiki/Ethernet>, accessed on Jan. 14, 2016.*
Port Exander, <https://en.wikipedia.org/wiki/Port_expander>, accessed on Jul. 13, 2016.*
Ethernet, <https://en.wikipedia.org/wiki/Ethernet>, accessed on Jul. 13, 2016.*
Network Interface Controller, <https://en.wikipedia.org/wiki/Network_interface_controller>, accessed on Jul. 13, 2016.*
Sellman, G., "System x—ML2 & ML-S Design Specification Version 1.2.160", dated Jul. 25, 2013, 55 pages.
Office Action dated May 19, 2017 for U.S. Appl. No. 14/161,843.
U.S. Office Action—Final Rejection for U.S. Appl. No. 14/161,843 dated Sep. 11, 2017.

* cited by examiner (a)

(b)

(c)

(d)

(e)

COMPUTING DEVICE INTERFACE CONNECTORS FOR PERIPHERAL COMPONENT INTERCONNECT COMPLIANT DEVICES AND OTHER DEVICES

BACKGROUND

Field of the Invention

The present invention relates to computing device peripheral connections, and more specifically, to computing device interface connectors for peripheral component interconnect (PCI) compliant devices and other devices.

Description of Related Art

The peripheral component interconnect (PCI) local bus is a type of local computer bus for attaching hardware components in a computing device. The PCI local bus specification defines an industry standard high-performance, low-cost local bus architecture. Further, the PCI local bus can support the functions found on a processor bus, but in a standardized format that is independent of any particular processor. Devices connected to the bus appear to the processor to be connected directly to the processor bus, and are assigned in the processor's address space.

PCI adapters are commonly used and many computers implement one or more standard PCI specification-defined connectors. These standard PCI adapters cannot be shared by a device other than the computer's main central processing unit (CPU), such as a baseboard management controller, because current PCI local bus connectors do not provide pins for shared or sideband connection. Another difficulty with the standard PCI connector interface is that the electrical current available to the adapter is limited due to the number and size of the connector pins dedicated to voltage and ground, especially for standby voltages. The standby current draw of many standard PCI adapters exceeds the maximum allowed by the PCI local bus specification, thus many standard PCI adapters cannot support functions that depend entirely on standby voltage. Examples of these functions include Wake on LAN (WoL) and Serial on LAN (SoL).

In view of the foregoing, there is a need for improved interfaces and specifications for connecting computer CPUs and other devices.

BRIEF SUMMARY

Disclosed herein are computing device interface connectors for PCI compliant devices and other devices. According to an aspect, an apparatus includes a PCI compliant device residing on a computing device. Further, the apparatus includes another device such as a network controller sideband interface (NCSI) compliant device residing on the computing device. The apparatus also includes an interface connector being communicatively connected to the PCI compliant device and the NCSI compliant device.

DETAILED DESCRIPTION

In accordance with embodiments of the present invention, apparatuses having an interface connector for communicatively connecting to one or more PCI compliant devices and one or more network controller sideband interfaces (NSCIs) are disclosed. More particularly, an interface disclosed herein may be used by I/O devices to communicate with host CPUs in a computing device, such as a server. The interface is sometimes referred to herein as an ML2 ("Mezzanine LAN On Motherboard (LOMb) Version 2") interface. This interface may address difficulties described herein by combining electrical signals and characteristics of NCSI into a single interface connector. This interface connector may include additional voltage and ground pins as compared to a typical PCI connector. An interface connector in accordance with embodiments of the present invention may allocate additional pins for standby voltages, thus allowing additional current to be passed from the host computing device to the ML2 adapter card that may be plugged into the connector. Such additional current may allow functions such as, but not limited to, WoL and SoL to operate.

Figure 1:
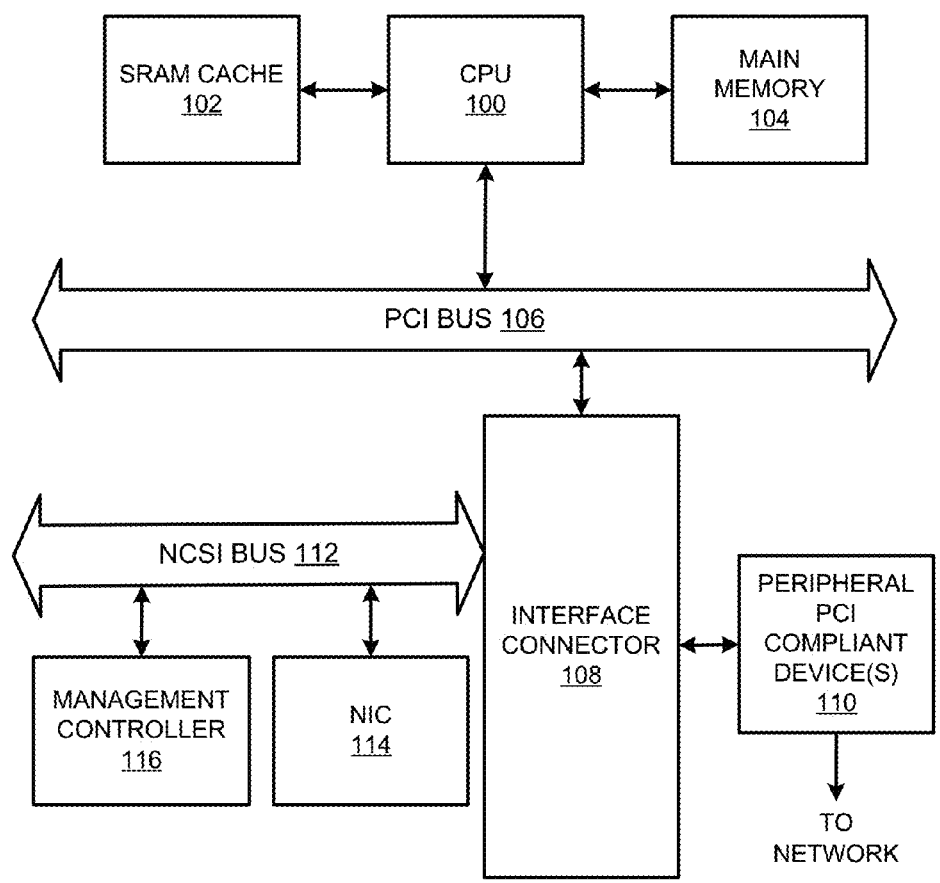
FIG. 1 is a block diagram of an example computing device architecture including one or more PCI compliant devices, one or more NCSI compliant devices, and an interface connector in accordance with embodiments of the present invention.

FIG. 1 illustrates a block diagram of an example computing device architecture including one or more PCI compliant devices, one or more network controller sideband interface (NCSI) compliant devices, and an interface connector in accordance with embodiments of the present invention. The computing device architecture is shown so as to highlight the hierarchical bus organization of the architecture of the computing device and its connection to other devices via the interface connector. In this example, the computing device is a server. Referring to FIG. 1, a CPU 100 may be communicatively connected to an SRAM cache 102. A main memory, such as DRAM, 104 may be directly connected to the CPU 100.

The CPU 100 may be communicatively connected to a PCI bus 106. The PCI bus 106 may be configured to be compliant with the PCI bus standard. In an example, the PCI bus 106 is a PCIe bus. The PCI bus 106 may serve as a primary I/O bus and may include control lines, address lines, and data lines. The PCI bus 106 may be communicatively connected to an interface connector 108 for interfacing with one or more peripheral devices 110. The peripheral device(s) 110 are configured to be compliant with the PCI bus standard.

The interface connector 108 may include one or more PCI slots for receiving the PCI compliant device(s) 110. Such add-in cards may include cards may include graphic accelerators, disk drive controllers, and other speed sensitive peripherals which may take advantage of the abilities of the PCI bus 106. Various buffers (not shown) may be used to buffer data transfers.

An NCSI bus 112 may be communicatively connected to the interface connector 108. The NCSI bus 112 may be compliant with the NCSI bus standard, and may include control lines, address lines, and data lines. The NCSI bus 112 may be communicatively connected to a network controller 114 and a management controller 116. The NCSI bus 112 may also be connected to any other NCSI compliant component. These components may operate in accordance with NCSI standards defined by the Distributed Management Task Force (DMTF) organization for specifying connectivity between a management controller and a network controller. The management controller 116 may be specialized microcontroller embedded on the motherboard of the computing device that monitors and manages the system. Alternatively, the management controller 116 may be referred to as a baseboard management controller (BMC) as will be understood by those of skill in the art. The network controller 114 may be an Ethernet controller configured to utilize the NCSI bus 112 and the interface connector 108 for providing network connectivity to the management controller 116. Example traffic involving the NCSI system is based on a request/response model. A management console may send a request and the management controller 116 may reply with a response. Information gathered may include, for example, temperatures, voltages, fan speed, thresholds, and the like. In an example, the NCSI system may be used for enabling functionality such as wake-on-LAN (local area network) and serial over LAN. Wake-on-LAN functions can be used in an Ethernet computing network environment for allowing a computing device to be turned on or awakened by a network message. Serial over LAN is a mechanism that enables input and output of a serial port of a managed system to be redirected over Internet protocol (IP).

The interface connector 108 may include one or more ports for connecting to a network. For example, the port may be an Ethernet port. Various buffers (not shown) may be used to buffer data transfers between buses 106 and 112. The interface connector 108 may have any suitable components for communicatively connecting to one or more PCI compliant devices and one or more NCSI compliant devices.

In accordance with embodiments of the present invention, an ML2 interface may functionally comply with the specifications of PCI. More particularly, the ML2 interface may comply with the PCI Express (PCIe) Base Specification Revision 3.0, with the exceptions of mechanical design and power delivery. The ML2 card may also adhere to all requirements per the PCI Express Card Electromechanical (CEM) Specification unless otherwise stated herein. In examples disclosed herein, use of PCIe is described, although it should be understood that any suitable PCI functionality may be implemented.

ML2 adapters disclosed herein may support interface speeds of up to or exceeding 8 Gb/s. Servers or other computing devices that support ML2 can include a suitable slot such as a Mezzanine LOM-socket (ML-S) slot, and can connect to a PCI Express Gen3 single x8 or single x16. A server may follow the platform design guidelines for a PCI Express Gen3 adapter slot when routing to a ML-S slot. It is noted that the PCIe specification requires all devices to support polarity inversion on their receivers. That is, the D+ and D− signals of each differential pair may be swapped during implementation. Each receiver may be responsible for detecting an inversion during the training sequence and inverting the received signal. The ML2 card may use suitable PCIe components that conform to the specification. Further, the ML2 card may use PCIe components that permit lane reversal for reversing the order of lane assignments. In an example, the ML0-S connector may provide an aggregate total of 16 PCIe lanes, which can support a single x8 device or a single x16 device. A single x8 link may be implemented by a device using lanes [0:7]. A single x16 link may be implemented by a device using lanes [0:15]. In some instances, ML2/ML-S designs can utilize the PCIe lanes starting with lane 0 and continue up to lane 15. An ML2 adapters may be, for example, configured to accept a spread spectrum clock input of up to +0/−0.5%.

The PCIe bus specification requires DC blocking caps on transmit (TX) signals originating from the ML2 card. Caps may not be required on the PCIe clock signals or the PCIe receive (RX) signals. The recommended values for the PCIe TX capacitors can depend on the ML2 card and what PCIe speeds it can support. In an example, an ML2 Card supporting Gen 2 speeds should use 100 nF capacitors. In another example, an ML2 Card supporting Gen 3 speeds should use 220 nF capacitors.

The wiring on a ML2 card for the PCIe connections may target a differential impedance of 85±10%. Since most or all of the wiring in the printed circuit boards is pseudo-differential (complementary single-ended transmission lines referencing a common plane), the single-ended impedance of the individual conductors may be taken into account when developing a printed circuit board cross-section. In an example, since the ground planes are the only reference planes that are guaranteed to be common across all printed circuit boards and connectors within the chassis, all high-speed wiring should reference only ground planes.

The ML2 card may functionally comply with the Reduced Media Independent Interface (RMII) Specification Revision 1.2 maintained by the RMII Consortium. In an example, an ML2 adapters may set the NC-SI package ID to a value of 2. This can ensure that systems with embedded LOMs using ID 0 are not affected.

Wiring on an ML2 card for RMII connections may target a single-ended impedance of 50±10%. Since the ground planes may be the only reference planes that are common across all printed circuit boards and connectors within the chassis, all high-speed wiring may reference only ground planes. In an example, RMII (NC-SI) signals residing on the ML2 adapter may have a length matched to within 10 mils or another suitable distance of one another. RMII (NC-SI) signals residing on system planars that implement an ML-S slot may length match the signals to within 15 mils or another suitable distance of one another. Total end-to-end RMII (NC-SI) length matching, ML2+ planar, may be 25 mils or another suitable distance.

In an example, in addition to driving ML2 activity LED signals to the system planar, for each port on a given ML2 adapter two rear IO panel LEDs may be utilized. Each port may utilize one GREEN LED for port Link and one GREEN LED for port Activity. The Green Activity LED(s) may blink on the ML2 adapter as long as there is port activity, regardless of speed. Meaning the LED(s) blinks for data rates of 10 Mb, 100 Mb, 1000 Mb and 10 Gb. The Green Link LED(s) may remain on solid once a port link is established. Activity and Link LED(s) may be viewable by a user standing off to either side at 60 degrees and at a distance of 8 feet. This translates into a point that is 7 feet out from the system and 4 feet to the side of the server. The wavelength for these LEDs is expected to be between 520-530 nm. LEDs that transmit light through a lightpipe or an overlay may have a clear, non-diffused lens type, to focus the light into the lightpipe or overlay. LEDs that do not transmit light through a lightpipe or overlay may have a frosted (diffused) lens to disperse the light and maximize the dispersion of the light from the LED. It should be understood that any suitable number, type, and configuration of LEDs may be implemented.

An interface connector, such as the interface connector 104 shown in FIG. 1, can include an edge connector and a matching socket. For example, the edge connector may include a portion of a PCB having traces that lead to the edge of the board for plug into the matching socket. The traces may terminate at a series of pins. Table 1 below shows an example ML2/ML-S pin list.

TABLE 1

ML2/ML-S Pin List

| Pin Number | Pin Name | Pin Number | Pin Name |
| --- | --- | --- | --- |
| B1 | ML2_PGOOD | A1 | 12V_AVAILABLE |
| B2 | GND | A2 | GND |
| B3 | 12V AUX | A3 | 12V AUX |
| B4 | GND | A4 | GND |
| B5 | GND | A5 | GND |
| B6 | 12V | A6 | 12V |
| B7 | 12V | A7 | 12V |
| B8 | GND | A8 | GND |
| B9 | GND | A9 | GND |
| B10 | 3.3V | A10 | GND |
| B11 | GND | A11 | 3.3V AUX |
| B12 | RX_ERR | A12 | GND |
| B13 | GND | A13 | PRESENT1_N |
| B14 | RMII_RXEN | A14 | GND |
| B15 | GND | A15 | RMII CLK 50 MHz |
| B16 | RMII_RXD0 | A16 | GND |
| B17 | GND | A17 | RMII_TXEN |
| B18 | RMII_RXD1 | A18 | GND |
| B19 | GND | A19 | RMII_TXD0 |
| B20 | UART_TXD | A20 | GND |
| B21 | UART_RXD | A21 | RMII_TXD1 |
| B22 | GND | A22 | GND |
| B23 | I2C_RESET_N | A23 | SYSTEM_ALL_PGOOD |
| B24 | I2C INT_N | A24 | RESERVED |
| B25 | GND | A25 | GND |
| B26 | I2C SCL | A26 | ACTIVITY_LED_PORT0_N |
| B27 | I2C SDA | A27 | ACTIVITY_LED_PORT1_N |
| B28 | GND | A28 | GND |
| KEY | ORIENTATION KEY | KEY | ORIENTATION KEY |
| KEY | ORIENTATION KEY | KEY | ORIENTATION KEY |
| B29 | GND | A29 | GND |
| B30 | PCIE_WAKE_N | A30 | ACTIVITY_LED_PORT2_N |
| B31 | PCIE_RESET_N | A31 | ACTIVITY_LED_PORT3_N |
| B32 | GND | A32 | GND |
| B33 | HSOP0 | A33 | CLOCK_P |
| B34 | HSON0 | A34 | CLOCK_N |
| B35 | GND | A35 | GND |
| B36 | HSOP1 | A36 | HSIP0 |
| B37 | HSON1 | A37 | HSIN0 |
| B38 | GND | A38 | GND |
| B39 | HSOP2 | A39 | HSIP1 |
| B40 | HSON2 | A40 | HSIN1 |
| B41 | GND | A41 | GND |
| B42 | HSOP3 | A42 | HSIP2 |
| B43 | HSON3 | A43 | HSIN2 |
| B44 | GND | A44 | GND |
| B45 | HSOP4 | A45 | HSIP3 |
| B46 | HSON4 | A46 | HSIN3 |
| B47 | GND | A47 | GND |
| B48 | HSOP5 | A48 | HSIP4 |
| B49 | HSON5 | A49 | HSIN4 |
| B50 | GND | A50 | GND |
| B51 | HSOP6 | A51 | HSIP5 |
| B52 | HSON6 | A52 | HSIN5 |
| B53 | GND | A53 | GND |
| B54 | HSOP7 | A54 | HSIP6 |
| B55 | HSON7 | A55 | HSIN6 |

TABLE 1-continued

ML2/ML-S Pin List

| Pin Number | Pin Name | Pin Number | Pin Name |
|---|---|---|---|
| B56 | GND | A56 | GND |
| B57 | RESERVED | A57 | HSIP7 |
| B58 | PRESENT2_N | A58 | HSIN7 |
| B59 | GND | A59 | GND |
| KEY | END OF x8 CONNECTOR | KEY | END OF x8 CONNECTOR |
| B60 | GND | A60 | GND |
| B61 | HSOP8 | A61 | HSIP8 |
| B62 | HSON8 | A62 | HSIN8 |
| B63 | GND | A63 | GND |
| B64 | HSOP9 | A64 | HSIP9 |
| B65 | HSON9 | A65 | HSIN9 |
| B66 | GND | A66 | GND |
| B67 | HSOP10 | A67 | HSIP10 |
| B68 | HSON10 | A68 | HSIN10 |
| B69 | GND | A69 | GND |
| B70 | HSOP11 | A70 | HSIP11 |
| B71 | HSON11 | A71 | HSIN11 |
| B72 | GND | A72 | GND |
| B73 | HSOP12 | A73 | HSIP12 |
| B75 | HSON12 | A75 | HSIN12 |
| B75 | GND | A75 | GND |
| B76 | HSOP13 | A76 | HSIP13 |
| B77 | HSON13 | A77 | HSIN13 |
| B78 | GND | A78 | GND |
| B79 | HSOP14 | A79 | HSIP14 |
| B80 | HSON14 | A80 | HSIN14 |
| B81 | GND | A81 | GND |
| B82 | HSOP15 | A82 | HSIP15 |
| B83 | HSON15 | A83 | HSIN15 |
| B84 | GND | A84 | GND |
| B85 | RESERVED | A85 | RESERVED |
| B86 | RESERVED | A86 | RESERVED |
| B87 | GND | A87 | GND |
| END | END OF x16 CONNECTOR | END | END OF x16 CONNECTOR |

Table 2 below shows names of example ML2/ML-S signals and their associated descriptions.

TABLE 2

ML2/ML-S Pin Descriptions

| Signal Name(s) | I/O Type | Description |
|---|---|---|
| RMII CLK 50 MHz | In | 50 MHz input reference clock for the RMII interface |
| RMII_TXD0 | In | 3.3 V level RMII transmit data bit 0 from IMM to ML2 adapter. |
| RMII_TXD1 | In | 3.3 V level RMII transmit data bit 1 from IMM to ML2 adapter. |
| RMII_TXEN | In | 3.3 V level RMII transmit enable from IMM to ML2 adapter. |
| RMII_RXD0 | Out | 3.3 V level RMII receive data bit 0 from ML2 adapter to IMM. |
| RMII_RXD1 | Out | 3.3 V level RMII receive data bit 1 from ML2 adapter to IMM. |
| RMII_RXEN | Out | 3.3 V level RMII receive enable from ML2 adapter to IMM. |
| RX_ERR | Out | Optional receiver error bit. |
| UART_TXD | Out | Serial UART data out to system planar debug connector |
| UART_RXD | In | Serial UART data in from the system planar debug connector. |
| SYSTEM_ALL_PGOOD | In | Input signal to the ML2 to indicate that all system power rails are valid. The system will provide a minimum of 100 ms from SYSTEM_ALL_PGOOD to PCIE_REST_N. |
| I2C INT_N | Out | Open drain, I2C interrupt out to management controller (IMM) or FPGA. Required to be a 3.3 V level signal at the ML2 connector. Signal level translation must be done on the ML2 adapter for levels other than 3.3 V. The system pulls this signal up with a 3.3 V Aux resistor. |

TABLE 2-continued

ML2/ML-S Pin Descriptions

| Signal Name(s) | I/O Type | Description |
|---|---|---|
| I2C SCL | Bi | Open drain, ML2 adapter Serial Clock bus connected to management controller or FPGA. Required to be a 3.3 V level signal at the ML2 connector. Signal level translation must be done on the ML2 adapter for levels other than 3.3 V. The system pulls this signal up with a 3.3 V Aux resistor. |
| I2C SDA | Bi | Open drain, ML2 adapter Serial Data bus connected to management controller or FPGA. Required to be a 3.3 V level signal at the ML2 connector. Signal level translation must be done on the ML2 adapter for levels other than 3.3 V. The system pulls this signal up with a 3.3 V Aux resistor. |
| I2C_RESET_N | In | Input into the ML2 card from the system that should reset all ML2 I2C devices when LOW. The system pulls this signal up with a 3.3 V Aux resistor. |
| ACTIVITY_LED_PORT[0:3]_N | Out | Open drain, active low output from the ML2 adapter to indicate data activity for each network port. |
| PRESENT1_N | In | Grounded on the system planar through 100 ohm PD. |
| PRESENT2_N | Out | Wired to PRESENT1_N on ML2 adapter to indicate presence to the host system. PU is on host system planar. |
| PCIE_WAKE_N | Out | Open drain, active low output from the ML2 card to indicate to the host system a Wake event request. |
| PCIE_RESET_N | In | PERST or PWRGD input from the host system. Active low signal, place PU on system planar. |
| CLOCK_P/ CLOCK_N | In | 100 MHz PCIe reference clock from host planar/system. |
| HSOP[0:15] HSON[0:15] | In | Host/CPU transmitter differential pairs. Output differential PCIe pairs from the host systems CPU. Pairs coming into the ML2 adapter. |
| HSIP[0:15] HSIN[0:15] | Out | Host/CPU receiver differential pairs. Input differential PCIe pairs to the host systems CPU. Pairs coming from the ML2 adapter ASIC. |
| 12V_AVAILABLE | In | Input from the host system indicating to the ML2 adapter that 12 V bulk power is up and the ML2 can transition from sourcing 12 V Aux to 12 V bulk if necessary or desired. 12V_AVAILABLE will go HIGH at least 10 ms after 12 V is with-in spec; it will go LOW at least 10 ms before 12 V goes out-of-spec. Boards which consume 15 W or less of 12 V Aux do not need to switch to 12 V bulk. |
| ML2_PGOOD | Out | Output to the system. High indicates the ML2 power rails are functioning normally. ML2_PGOOD must be HIGH with-in 50 ms of 12V_AVAILABLE going HIGH and must remain HIGH while 12V_AVAILABLE is HIGH; ML2 PGOOD is ignored when 12V_AVAILABLE is LOW. |
| 12V | Power | Switched 12 V power source. Switched on when system is on; off when system is off. |
| 12V Aux | Power | Unswitched 12 V power source. Always on. |
| 3.3V | Power | Switched 3.3 V power source. Switched on when system is on; off when system is off. |
| 3.3V Aux | Power | Unswitched 3.3 V power source. Always on. |
| GND | Power | System ground, logic and power. |

Table 3 below provides information related to voltage and current available to an example ML2 adapter and ML-S slot.

TABLE 3

| ML-S Slot Power Ratings | |
|---|---|
| Power Rail | x8/x16 Common Ethernet Adapter |
| 12 V | |
| Nominal Voltage | 12 V |
| Voltage Tolerance | +/−5% |
| Supply Current | 2.5 A (Imax) |
| Power | 30 W (Pmax) |
| Capacitance | 330 uF (Cmax) |
| 12 V Aux | |
| Nominal Voltage | 12 V |
| Voltage Tolerance | +/−5% |
| Supply Current | 1.25 A (Imax) |
| Power | 15 W (Pmax) |
| Capacitance | 330 uF (Cmax) |

TABLE 3-continued

ML-S Slot Power Ratings

| Power Rail | x8/x16 Common Ethernet Adapter |
|---|---|
| 3.3 V | |
| Nominal Voltage | 3.3 V |
| Voltage Tolerance | +/−5% |
| Supply Current | 0.375 A (Imax) |
| Power | 1.2375 W (Pmax) |
| Capacitance | 150 uF (Cmax) |
| 3.3 V Aux | |
| Nominal Voltage | 3.3 V |
| Voltage Tolerance | +/−5% |
| Supply Current | 0.375 A (Imax) |
| Power | 1.2375 W (Pmax) |
| Capacitance | 150 uF (Cmax) |

It is noted that adapter inrush currents may be limited so as not to exceed the maximum currents specified in the above Table 3.

Table 4 below provides information related to the maximum expected power draw of an example ML2 adapter across all rails simultaneously.

TABLE 4

ML2 Card Maximum Power Dissipation

| Form Factor | x8 PCIe, (2) x8 PCIe or x16 PCIe |
|---|---|
| ML2 | 30 W (max) |

Figure 2:
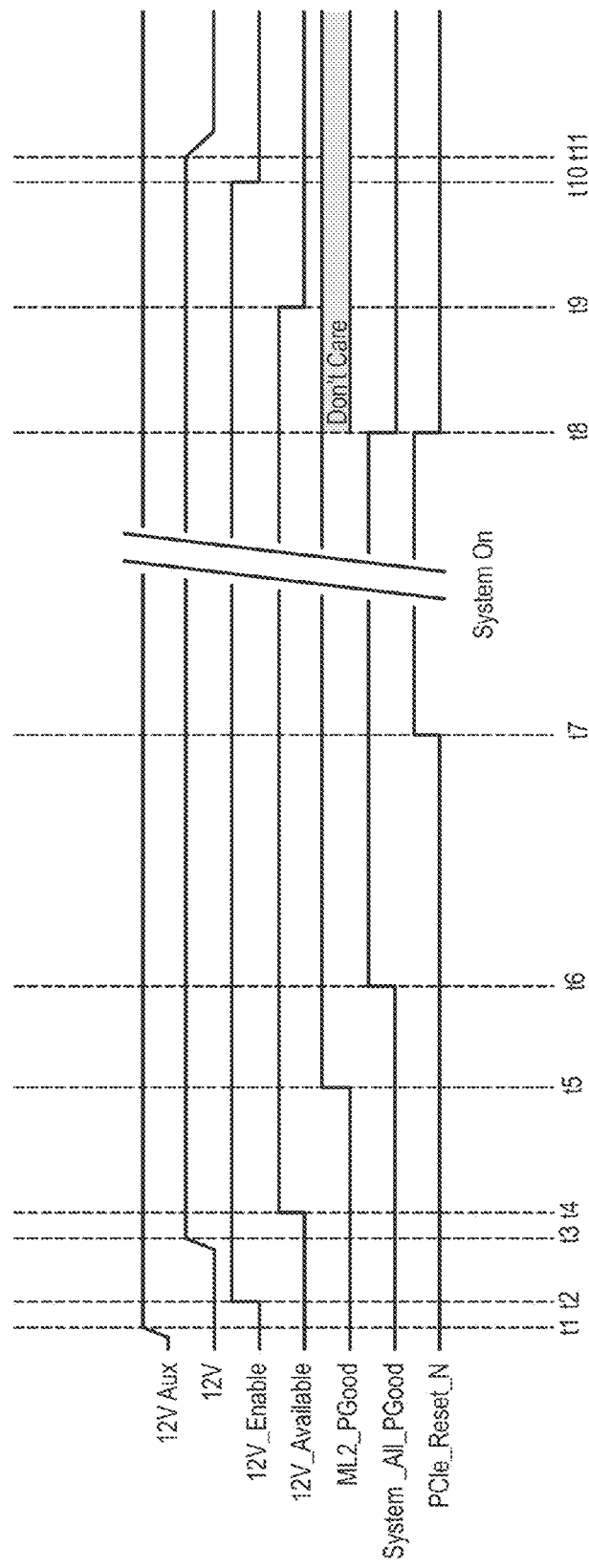
FIG. 2 is a signaling diagram showing the power on/off sequence for auxiliary (Aux) power rails.

FIG. 2 illustrates a signaling diagram showing the power on/off sequence for auxiliary (Aux) power rails. There may also be a primary power supply connected to primary power rails. The Aux power rails and the primary power rails may be connected to an Aux power supply and the primary power supply, respectively. Aux power rails may come up in any order. In an example, 12V can come up after all Aux rails are up (see 12V_AVAILABLE). Referring to FIG. 2, example signal timing for time (t) follows:

t3→t4>=10 ms
t4→t5<=50 ms
t6→t7=100 ms
t8=OS orderly shutdown or 4 second power button override
t8→t9>=50 ms
t9→t10=50 ms Although any suitable technique and timing for powering may be utilized, some other techniques and timing may result in AC line cord pull or a voltage regulator failure.

Figure 3:
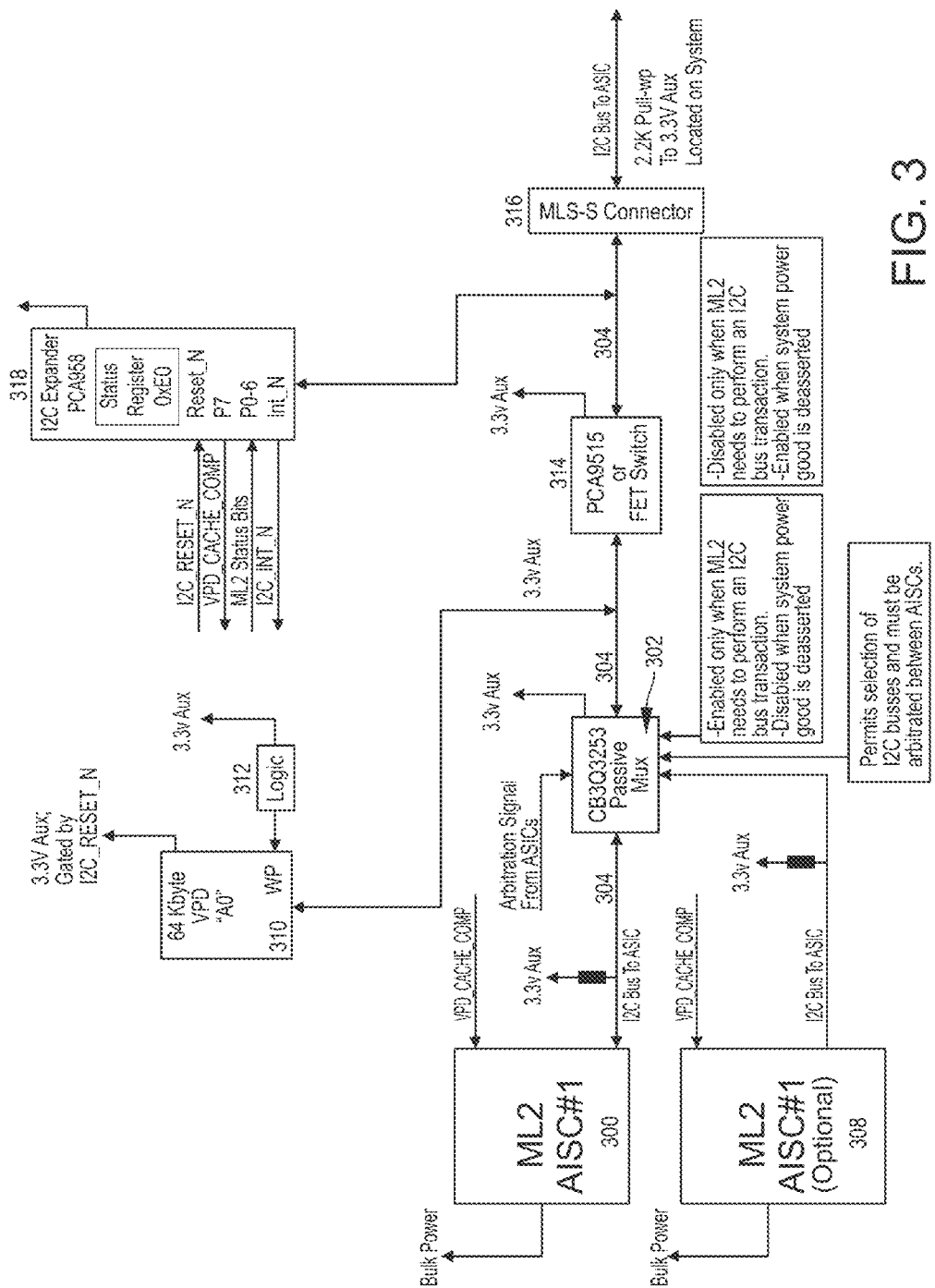
FIG. 3 is a schematic diagram of an example ML2 I2C system having a shared I2C bus segment in accordance with embodiments of the present invention.

Communication between an ML2 card and a management controller may be provided through a shared I2C bus segment. FIG. 3 illustrates a schematic diagram of an example ML2 I2C system having a shared I2C bus segment in accordance with embodiments of the present invention. Referring to FIG. 3, the system includes an application-specific integrated circuit (ASIC) 300 being operably connected to a passive multiplexer (MUX) 302 via an I2C bus 304. The MUX 302 may be any suitable MUX such as a CB3Q3253 MUX. The system may include another ASIC 308 that is operatively connected to the passive MUX 302. The MUX 302 may be configured to permit selection of I2C busses and may be arbitrated between ASICs. Further, the MUX 302 may be enabled only when ML2 needs to perform an I2C bus transaction. The MUX 302 may be disabled when system power good is de-asserted. The MUX 302 may be utilized in an ML2 having multiple ASICs. The MUX 302 to isolate the I2C bus and ensure that it is utilized by only one ASIC at any time.

The system includes a VPD component 310 that is configured to store vital product data for the ML2 card and may be accessed or changed by either the ML2 local ASIC or the systems management module. Component 310 includes an input for receipt of the I2C_RESET_N signal for input to reset all ML2 I2C devices when LOW. The system can pull this signal up with a 3.3V Aux resistor, for example. The Logic component 312 may control the WP pin as data is changed.

The system includes a suitable I2C repeater 314 configured to extend the functionality of the I2C bus 304. The I2C repeater 314 may be, for example, a PCA9515 I2C repeater or a field effect transistor (FET) switch, which may prevent bus contention and may disconnect the systems management module from the I2C bus when the ML2 local ASIC writes VPD. The I2C repeater 314 may be communicatively connected to an interface connector 316.

The system may include an I2C expander 318 providing GPIO expansion with interrupt and reset for the I2C bus 304. The I2C expander 318 may be a PCA953816-pin CMOS device having 8 bits of GPIO expansion functionality. The I2C expander 318 may include inputs for receipt of the I2C_RESET_N and ML2 status bits signals as described in further detail herein. Further, the I2C expander 318 may include outputs for communication of the VPD_CACHE_COMP and the I2C_INT_N signals as described in further detail herein.

Figure 4:
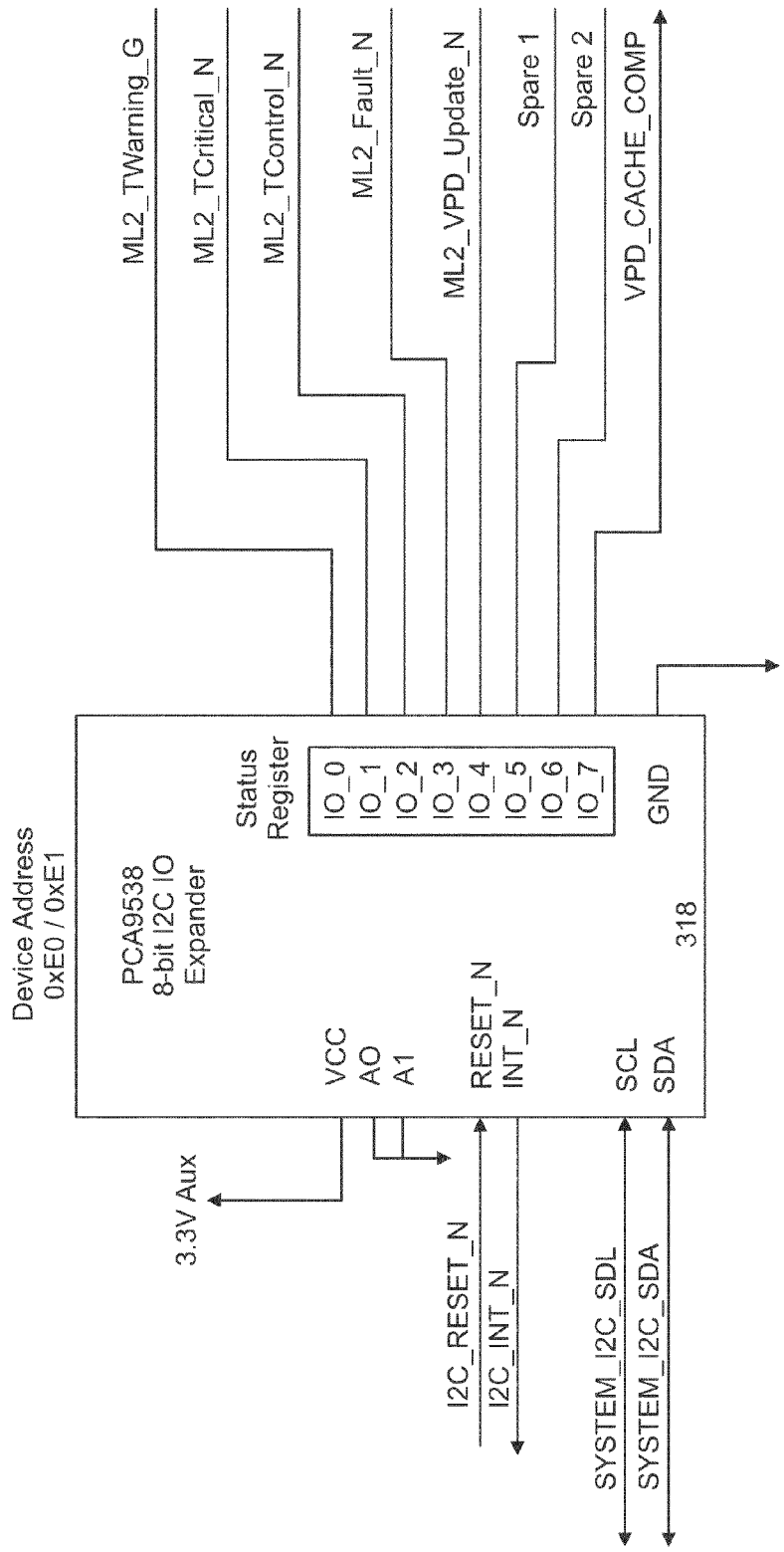
FIG. 4 is a schematic diagram of more detail of the I2C expander shown in FIG. 3.

FIG. 4 illustrates a schematic diagram of more detail of the I2C expander 318 shown in FIG. 3. Referring to FIG. 4, the I2C expander 318 may include inputs and outputs for connection to the signals as shown. Particularly, the I2C expander 318 may be communicatively connected to a system I2C clock line (System_I2C_SCL) and a serial data line (System_I2C_SDA). Further, the I2C expander may be communicatively connected to other lines as shown and described in further detail herein.

It is noted that the ML2 I2C interrupt signal (I2C_INT_N) shown in FIG. 4 can be activated on a transition. Further, the interrupt signal may only be activated on a transition (0→1 or 1→0) for any bit in the status register. Further, the system may be configured such that rewriting the same state to a status bit (1→1) does not activate the interrupt signal. The interrupt signal may be cleared on a read of the status register.

Figure 5:
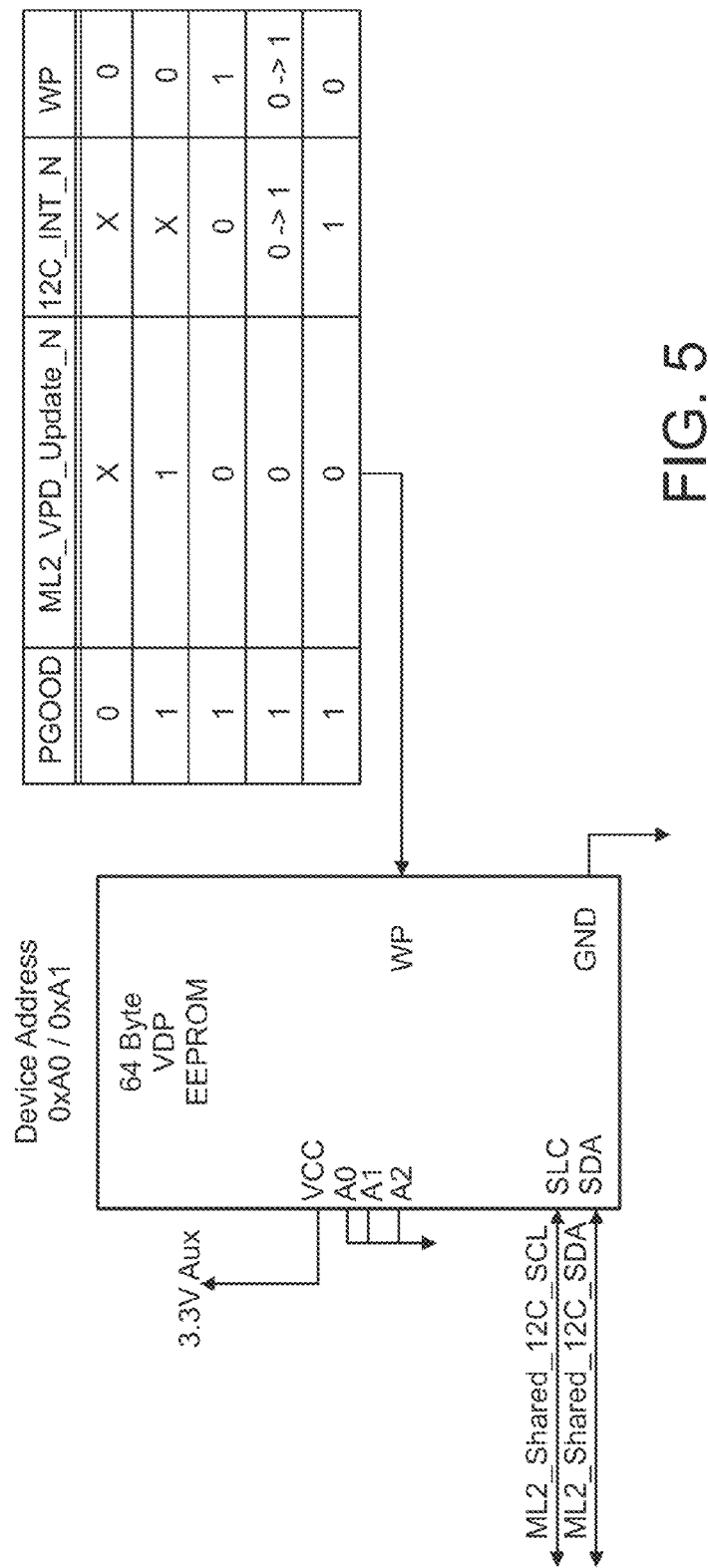
FIG. 5 is a schematic diagram showing example VPD write protect usage in accordance with embodiments of the present invention.
Figure 6:
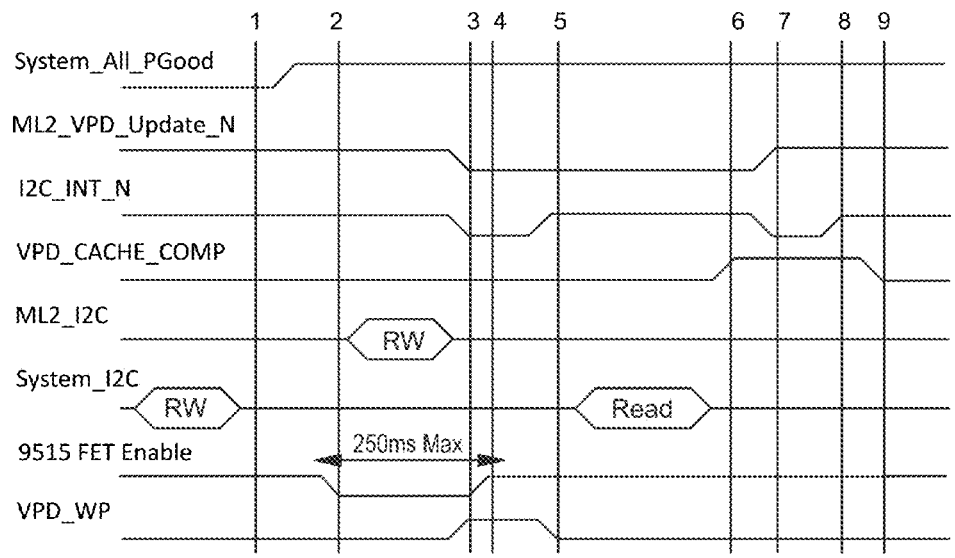
FIG. 6 shows a timing diagram of an access sequence associated with the VPD write protect example of FIG. 5.

FIG. 5 illustrates a schematic diagram showing example VPD write protect usage in accordance with embodiments of the present invention. Further, FIG. 6 shows a timing diagram of an access sequence associated with the VPD write protect example of FIG. 5. Referring to FIGS. 5 and 6, several steps may be implemented when the ML2 accesses the VPD over the I2C bus, such as the I2C bus 304 shown in FIG. 3. Initially, the SYSTEM_ALL_PGOOD may be de-asserted. The system may have full access of the I2C bus. Subsequently, the SYSTEM_ALL_PGOOD signal may be asserted, and the ML2 may require access to I2C. ML2 may disconnect the I2C repeater (e.g., the PCA9515 repeater 314 shown in FIG. 3) and may enable the local FET to access the bus. The ML2 may have a suitable time period (e.g., 250 ms) to perform I2C transactions. Subsequently, the ML2 may complete I2C transactions and may assert an ML2_VPD_UPDATE_N signal prior to enabling the I2C repeater. The I2C repeater may assert the I2C_INT_N signal, and the VPD Write Protect input should be enabled. The ML2 device may disable the local FET, and may enable I2C repeater to provide the system with full access to I2C bus. The system may read the I2C expander due to interrupt. Further, the I2C expander may de-assert the I2C_INT_N signal, which may then disable the write protect input of the VPD. The system may detect that the ML2_VPD_UPDATE_N signal is asserted and may re-cache VPD data. Once VPD re-cache read operation completes, the system may assert the VPD_CACHE_COMPLETE (b'1) signal. Further, the ML2 device may detect VPD_CACHE_COMPLETE assertion and may de-assert ML2_VPD_UPDATE_N (b'1) signal. The I2C expander may assert the I2C_INT_N signal. The system may detect the I2C_INT_N signal and may read the I2C expander, which may de-assert the interrupt. The system may detect that the ML2_VPD_UPDATE_N signal has been de-asserted, and may de-assert the VPD_CACHE_COMPLETE (b'0) signal. With these steps, the cycle has completed and the ML2 can reacquire the I2C bus if needed. It is noted that the ML2 device may not access the I2C bus again until all steps in the cycle have been completed.

A status register may be required to present ML2 operation status to the system. This port expander may reside on the system side of the I2C bus and may never be disconnected. The ML2 card may not directly read or write to this register over I2C as the eight I/O pins of the port expander should be used by the ML2 card. Unused and reserved status register pins can be pulled high so as to not cause unwanted interrupts to the system.

Table 5 below shows example status register definitions.

TABLE 5

Status Register Definition

| I/O Register Bit | Bit Name | I/O | Description | Required/ Optional |
|---|---|---|---|---|
| 7 | VPD_CACHE_COMP [Note: 1] | Out | [1]: Set by the system's management controller to indicate to the ML2 that the VPD cache update has completed. [0]: DEFAULT | Required |
| 6 | RESERVED | | | |
| 5 | RESERVED | | | |
| 4 | ML2_VPD_UPDATE_N [Note: 1] | In | [1]: DEFAULT. Set by the ML2 adapter once VPD_CACHE_COMP has been received. [0]: Set when a change to VPD has completed on the ML2 adapter. | Required |
| 3 | ML2_FAULT_N [Note: 2] | In | [1]: DEFAULT. Must be pulled high if not implemented. [0]: ML2 adapter is unable to complete initialization, and will not function as expected. This bit reflects a critical error has occurred on the ML2 and a FRU replacement may be required. | Optional |
| 2 | ML2_$T_{Control}$_N [Note: 3, 4] | In | [1]: DEFAULT. Cleared when temperature drops below the $T_{Control}$ thermal threshold and the chassis fans can be reduced [0]: Set when the ML2 adapter needs to request additional cooling without causing a warning level chassis alert. | Required |
| 1 | ML2_$T_{Critical}$_N [Note: 3, 4] | In | [1]: DEFAULT. Must be pulled high if not implemented. [0]: Set when ML2 temperature meets/exceeds the second thermal threshold. The system's management controller will shutdown the server when this threshold has been reached. A chassis fault alert will be generated for the end user. | Optional |
| 0 | ML2_$T_{Warning}$_N [Note: 3, 4] | In | [1]: DEFAULT. Cleared when ML2 temperature drops below the first thermal threshold. Must be pulled high if not implemented. [0]: Set when ML2 temperature meets/exceeds the first thermal threshold. The system's management controller will raise the fan speeds to 100% PWM when this threshold has been reached. | Optional |

It is noted that the thermal status bits may not be accurate if the ML2 is in a fault state, and therefore should be ignored. Further, it is noted that Bit [3] is not to be set along with this bit.

Servers supporting ML2 adapters may be configured to provide an ambient temperature of 55° C. or less and at least 300 lfm of airflow.

For the purpose of modeling and sizing heatsinks, ML2 adapter designers can make the following assumptions about a system in the off or standby power state.

A system in the off (Aux power only) state can be assumed to have a 45° C. internal temperature with 50 lfm of airflow due to natural convection. A system in a standby state, such as S3, can be assumed to have a 50° C. internal temperature with 50 lfm of airflow due to natural convection. ML2 adapters may include heat sinks on high power components.

The $ML2\_T_{Control\_}N$ may be set when an ML2 adapter needs to request additional cooling without causing a warning level chassis alert. The expectation of this bit is that it may trigger on a lower thermal threshold than the $ML2\_T_{Warning\_}N$ (bit 0) or $ML2\_T_{Critical\_}N$ (bit 1) thresholds. It may be required that the thermal monitoring devices can be programmable since thermal thresholds may require adjustment based upon system variables. The $T_{Control}$ temperature threshold may be reported in VPD. The ML2 card may provide a single $ML2\_T_{Control\_}N$ regardless of the number of devices present on the ML2 adapter.

ML2 $T_{Critical\_}N$ may be set when ML2 temperature meets/exceeds the second thermal threshold. In this example, the second threshold equals the shutdown temperature, which equals the maximum operating temperature. The expectation is that the chassis management can shut down the system server when this threshold has been reached on a ML2 card. A chassis fault alert can also be generated for the end user.

Thermal monitoring devices may be programmable since thermal thresholds may require adjustment based upon system variables. The $T_{Critical}$ temperature threshold can be reported in VPD. Further, the ML2 card may provide a single ML2 $T_{Critical\_}N$ regardless of the number of devices present on the ML2 adapter.

$ML2\_T_{Warning\_}N$ may be set when the ML2 temperature meets or exceeds the first thermal threshold. For example, a first threshold may equal a warning temperature, which may equal a lower threshold of max operating range. The chassis management may raise the fan speeds to 100% PWM when this threshold has been reached on an ML2 adapter. The thermal monitoring devices may be programmable since thermal thresholds may require adjustment based upon system variables. The $T_{Warning}$ temperature threshold can be reported in VPD. The ML2 card must provide a single $ML2\_T_{Warning\_}N$ regardless of the number of devices present on the ML2 adapter.

$T_{Control}$, $T_{Warning}$, and $T_{Critical}$ thresholds may have ML2/vendor/technology specific values. If all three interrupts are not available from a particular ML2 device, connection may be in the order of $T_{Control}$ first (required), $T_{Warning}$ second (optional) and $T_{Critical}$ third (optional).

Figure 7:
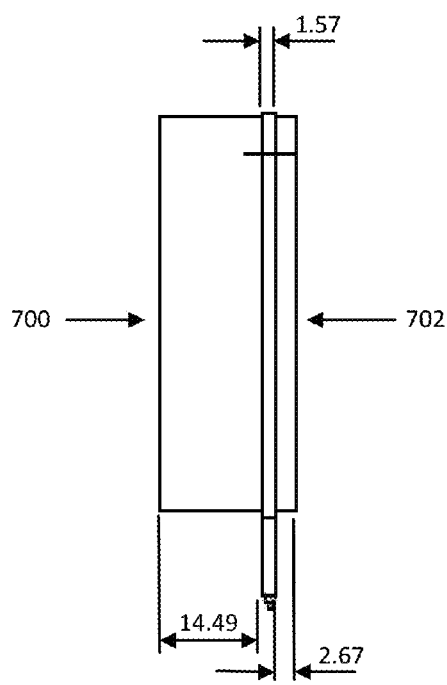
FIG. 7 depicts a side view of an example adapter in accordance with embodiments of the present invention.

FIG. 7 illustrates a side view of an example adapter in accordance with embodiments of the present invention. Referring to FIG. 7, example thicknesses and component height restrictions of the adapter are shown. The component side portion is indicated by reference 700, and the solder side portion is indicated by reference 702. The measurements in the figure are shown in millimeters.

Figure 8:
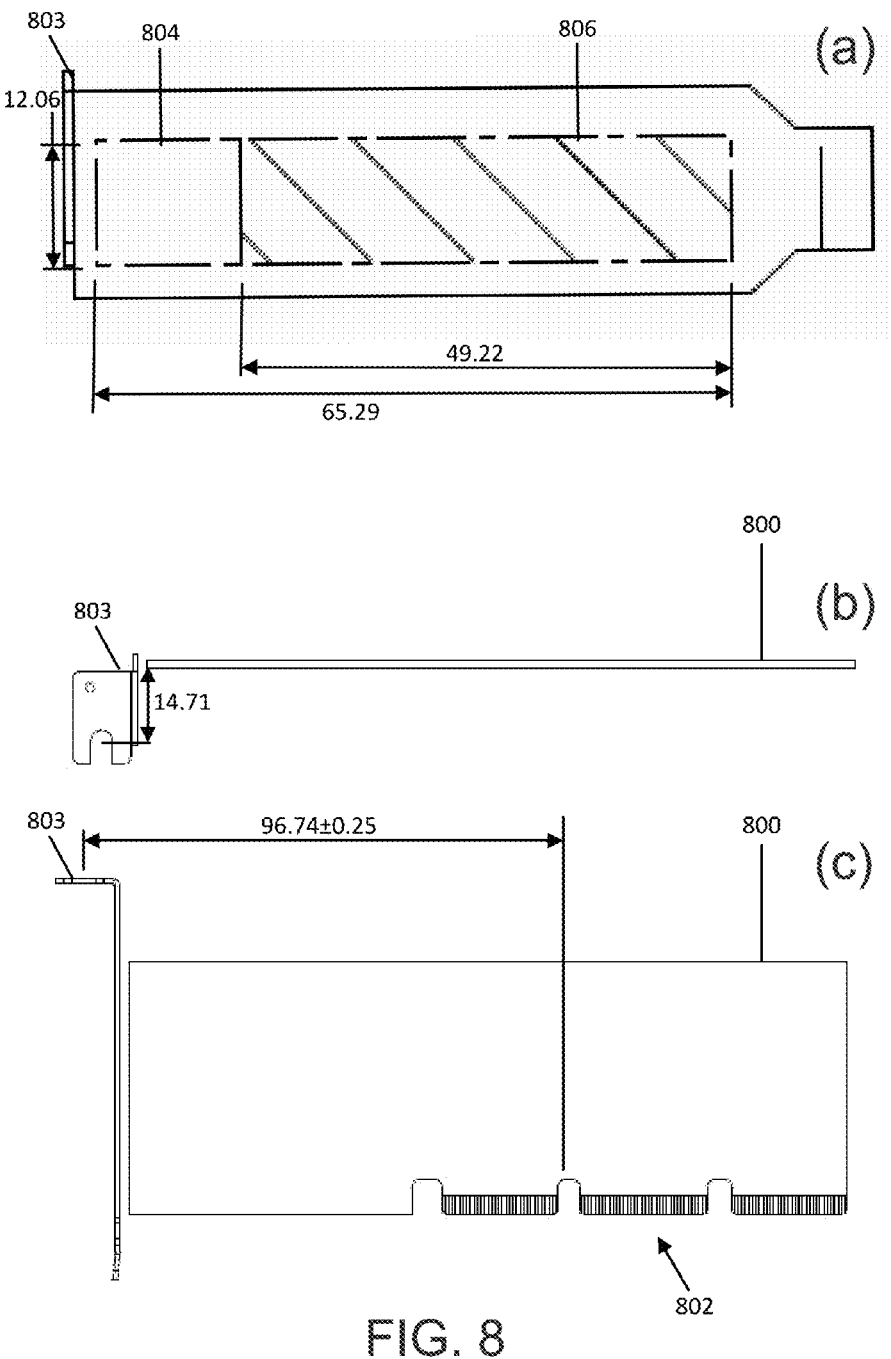
FIG. 8 depicts different views of an example ML2 adapter in accordance with embodiments of the present invention.

FIG. 8 illustrates a front view (a), a side view (b), and a top view (c) of an example ML2 adapter in accordance with embodiments of the present invention. The ML2 adapter shown in the figure is a 50 mm ML2 adapter. Referring to FIG. 8, example length and width of the adapter are shown. The adapter includes a card 800 having an edge connector 802 with a plurality of pins. Further, the adapter includes a mount 803 defining a chassis opening 804 and a connector opening 806. The mount 803 can be suitably connected to a server or other computing device. The adapter follows PCIe specification for a low profile I/O bracket. The adapter may be all or part of an interface connector. The measurements in the figure are shown in millimeters.

Figure 9:
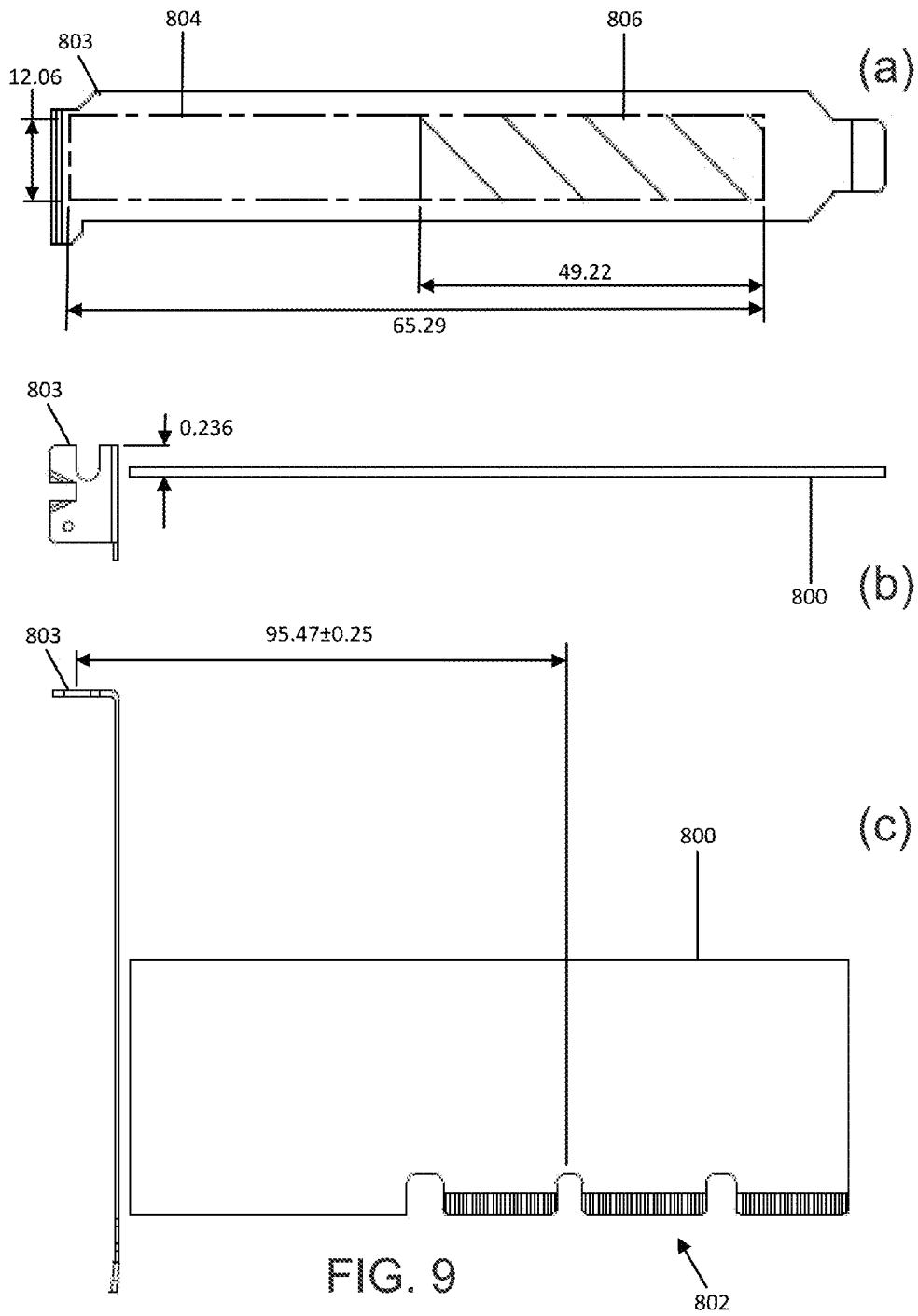
FIG. 9 depicts different views of another example ML2 adapter in accordance with embodiments of the present invention.

FIG. 9 illustrates a front view (a), a side view (b), and a top view (c) of another example ML2 adapter in accordance with embodiments of the present invention. The ML2 adapter shown in the figure is a 50 mm ML2 adapter.

Referring to FIG. 9, example length and width of the adapter are shown. The adapter follows PCIe specification for a low profile I/O bracket. The adapter may be all or part of an interface connector.

Figure 10:
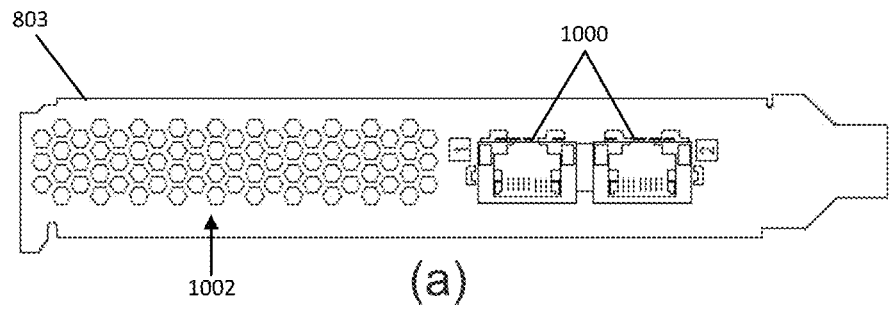
FIG. 10 depicts different views of examples mounts and ports in accordance with embodiments of the present invention.
Figure 10:
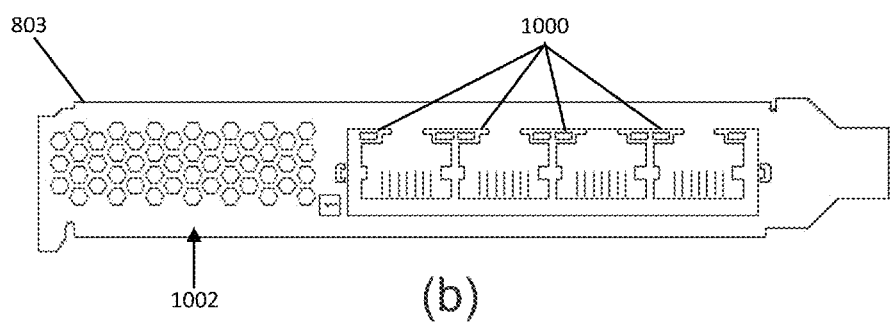
Figure 10:
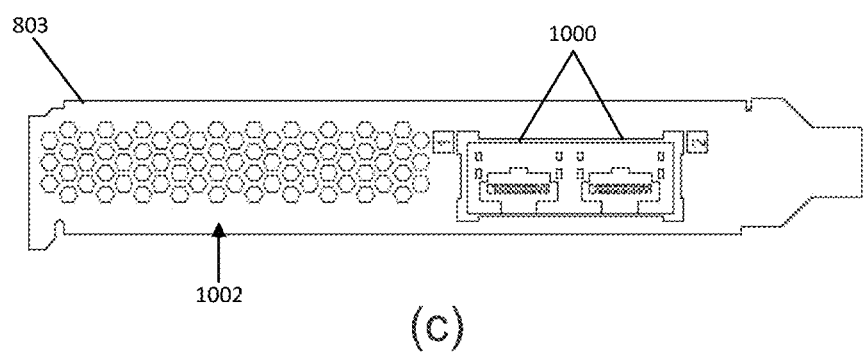

FIG. 10 illustrates front views (a)-(c) of examples mounts 803 and ports 1000 in accordance with embodiments of the present invention. The mounts 803 and ports 1000 may be part of the 50 mm ML2 adapters shown in FIGS. 8 and 9. Referring to FIG. 10, the mount 803 may define multiple holes to form a vent 1002.

Although 50 mm ML2 adapter and associated components are described herein, it should be understood that 60 mm ML2 adapters and components may also be employed in accordance with embodiments of the present invention. Such adapters may have any suitable sizes and dimensions.

Figure 11:
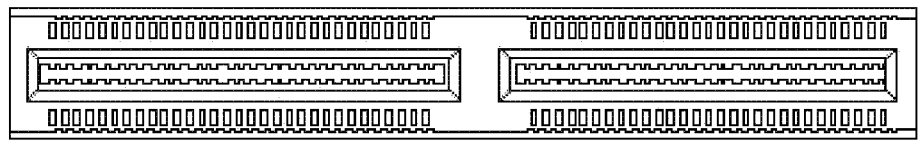
FIG. 11 depicts different views of an example socket in accordance with embodiments of the present invention.
Figure 11:
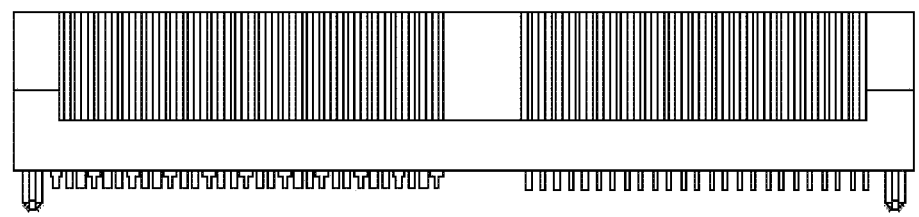
Figure 11:
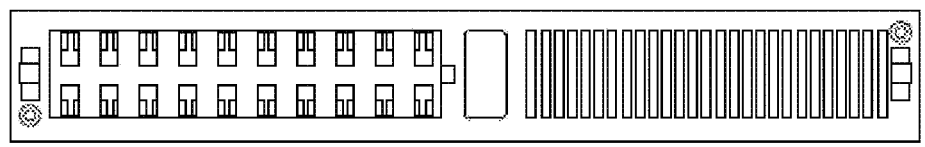
Figure 11:
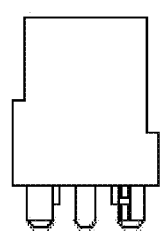
Figure 11:
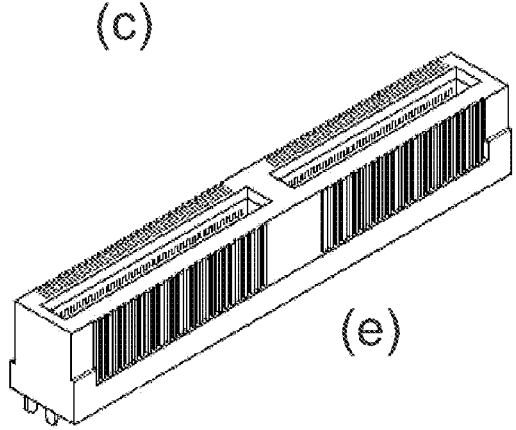

In accordance with embodiments of the present invention, an interface connector may have a suitable physical connector and planar pads. As an example, FIG. 11 illustrates different views of an example socket. Particularly, the socket shown in FIG. 11 is a 118 pin connector that can support a PCIe x8 ML2. Referring to FIG. 11, view (a) is a top view, view (b) is a front view, view (c) is a bottom view, view (d) is a side view, and view (e) is a perspective view.

Figure 12:
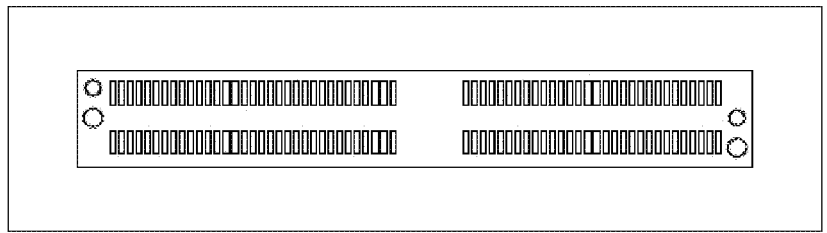
FIG. 12 is a top view of an example interface connector component including planar pads in accordance with embodiments of the present invention.

FIG. 12 illustrates a top view of an example interface connector component including planar pads. In this example, the planar pads accommodate a 118 pin connector.

Figure 13:
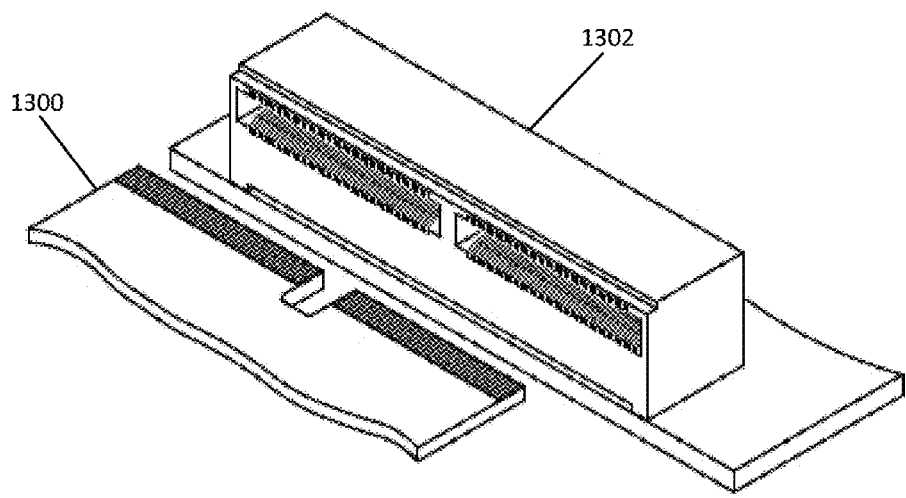
FIG. 13 is a perspective view showing another example of an elevated interface connector in accordance with embodiments of the present invention.

FIG. 13 illustrates a perspective view showing another example of an elevated interface connector in accordance with embodiments of the present invention. Referring to FIG. 13, the interface connector includes a card edge 1300 (a portion of which is shown in cut away for convenience of illustration) and an elevated socket 1302 for receiving and interfacing with the card edge 1300.

Figure 14:
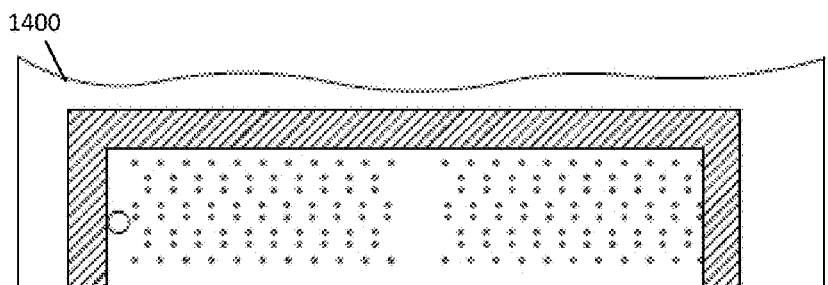
FIG. 14 depicts different views of example components of another interface connector in accordance with embodiments of the present invention.
Figure 14:
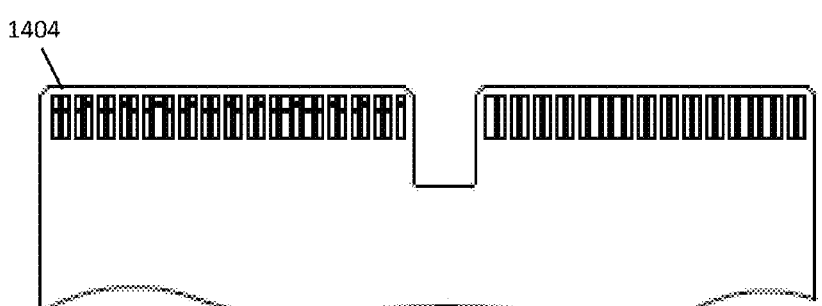

FIG. 14 illustrates views of example components of another interface connector in accordance with embodiments of the present invention. Referring to FIG. 14, view (a) is a top view of a press-on board 1400 having a connector footprint 1402. View (b) is a top view of a portion of a card edge 1404 for interfacing with the board 1400.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a peripheral component interconnect (PCI) compliant device residing on a computing device;
   a network controller sideband interface (NCSI) compliant device residing on the computing device;
   an interface connector being communicatively connected to the PCI compliant device and the NCSI compliant device, the interface connector includes two or more ground pins, wherein voltage is passed from the PCI compliant device and the NCSI compliant device to form a single interface; and
   a port expander coupled to the interface connector, the port expander configured to set a value for a status register associated with the interface connector and communicate the value of the status register to the computing device, the status register comprising one or more register bits indicating that a thermal condition of the interface connector meets a predetermined thermal condition without causing a system interrupt and that the thermal condition exceeds the predetermined thermal threshold of the interface connector of the apparatus.

2. The apparatus of claim 1, further comprising a central processing unit (CPU) and a memory being communicatively connected to the interface connector.

3. The apparatus of claim 1, further comprising a PCI bus configured to communicatively connect the PCI compliant device to the interface connector.

4. The apparatus of claim 1, further comprising a NCSI bus configured to communicatively connect the NCSI compliant device to the interface connector.

5. The apparatus of claim 1, further comprising power rails connected to the interface connector.

6. The apparatus of claim 5, further comprising a primary power supply and an auxiliary power supply that are each respectively connected to a primary power rail and an auxiliary power rail of the power rails.

7. The apparatus of claim 5, wherein the auxiliary power supply and the primary power supply are controlled to power up the auxiliary power rail prior to power up of the primary power rail.

8. The apparatus of claim 1, wherein the interface connector includes a pin for thermal monitoring.

9. The apparatus of claim 8, wherein the pin is communicatively connected to a thermal monitoring device configured to detect a thermal condition and signal the thermal condition on the pin.

10. The apparatus of claim 1, wherein the interface connector comprises a plurality of pins for communicatively connecting to at least one bus.

11. The apparatus of claim 10, wherein the at least one bus is communicatively connected to the NCSI compliant device and the PCI compliant device.

12. The apparatus of claim 1, wherein the interface connector includes one or more standby voltage pins.

13. The apparatus of claim 12, wherein one of Wake on LAN (WoL) and Serial on LAN (SoL) operate on the one or more standby voltage pins.

14. The apparatus of claim 1, wherein the computing device is a server communicatively connected to a network.

15. The apparatus of claim 1, wherein the NCSI compliant device comprises a management controller.

16. The apparatus of claim 1, wherein the NCSI compliant device comprises a network controller.

17. The apparatus of claim 16, wherein the network controller comprises an Ethernet controller.

18. The apparatus of claim 1, wherein the interface connector comprises an Ethernet port.

* * * * *